May 17, 1938. C. SAUZEDDE 2,117,683
HYDROSTATIC BRAKE
Filed Oct. 30, 1936 3 Sheets-Sheet 1

INVENTOR
Claude Sauzedde,
BY
ATTORNEYS

May 17, 1938.　　　　C. SAUZEDDE　　　　2,117,683
HYDROSTATIC BRAKE
Filed Oct. 30, 1936　　　3 Sheets-Sheet 3

INVENTOR
Claude Sauzedde,
BY
ATTORNEYS

Patented May 17, 1938

2,117,683

UNITED STATES PATENT OFFICE 2,117,683

HYDROSTATIC BRAKE

Claude Sauzedde, Detroit, Mich., assignor to Detroit Hydrostatic Brake Corporation, Detroit, Mich., a corporation of Michigan Application October 30, 1936, Serial No. 108,352

11 Claims. (Cl. 188—152)

The present invention relates to hydrostatic brakes for automotive vehicle and air craft use and to means for sealing the fluid pressure chambers in which reciprocating elements are mounted to be moved in response to fluid pressure for forcing brake shoes into engagement with brake drums.

The primary object of the present invention is to provide a hydrostatic brake having an element movable in response to fluid pressure for applying the brake shoes against the drum with sealing means between the movable element and its stationary support for preventing leakage of fluid from the pressure chamber. The sealing means is in the form of an open ended cylinder formed of elastic material such as rubber and it has its opposite ends surface bonded to the element which moves in response to fluid pressure and to a pilot therefor on a stationary spider supporting the movable element.

Another object of the present invention is to provide a hydrostatic brake having brake shoes movable radially to engage braking surfaces on a brake drum and a stationary spider for supporting the shoes and for guiding their radial movement, the spider having a fluid pressure unit mounted adjacent each shoe guide which when moved outwardly in response to fluid pressure engages the respective shoe to force it into engagement with the drum. Each pressure unit comprises a movable element and a pilot formation on the spider having interfitting portions providing a fluid pressure chamber, and an elastic sleeve having one end vulcanized to the pilot portion and its other end vulcanized to the movable element. The elastic sleeve thus serves to permanently secure the movable element upon the spider and to seal the pressure chamber to prevent leakage of fluid therefrom, with the result that the entire fluid pressure unit is permanently assembled upon the spider, independently of the shoes.

With the above and other ends in view the invention is more fully disclosed with reference to the accompanying drawings, in which Figure 1 is a vertical section;

Like characters of reference are employed throughout to designate corresponding parts.

Figures 1, 5:
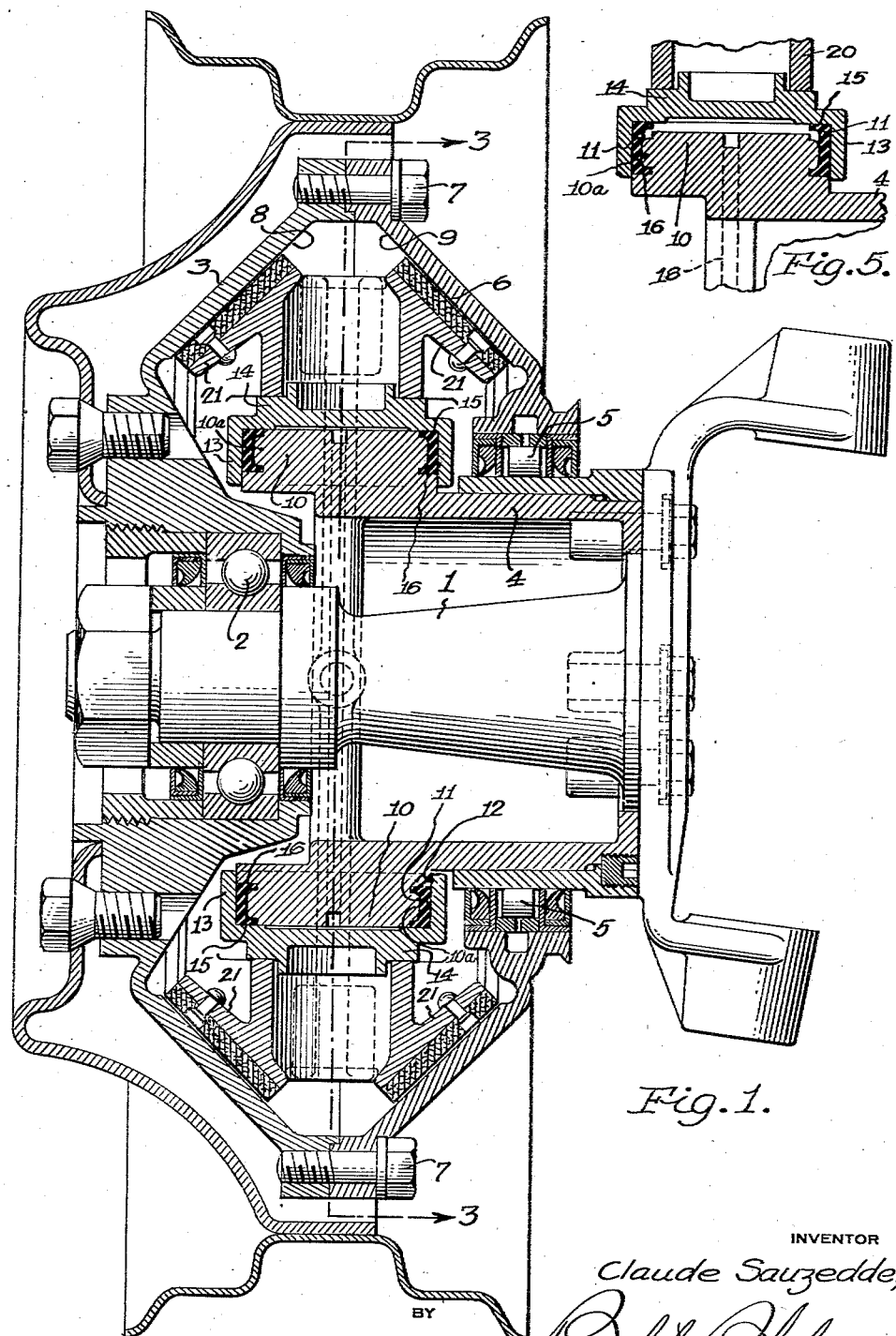
Fig. 5 is a section illustrating a different stage in the operation of the fluid pressure means.
Figure 2:
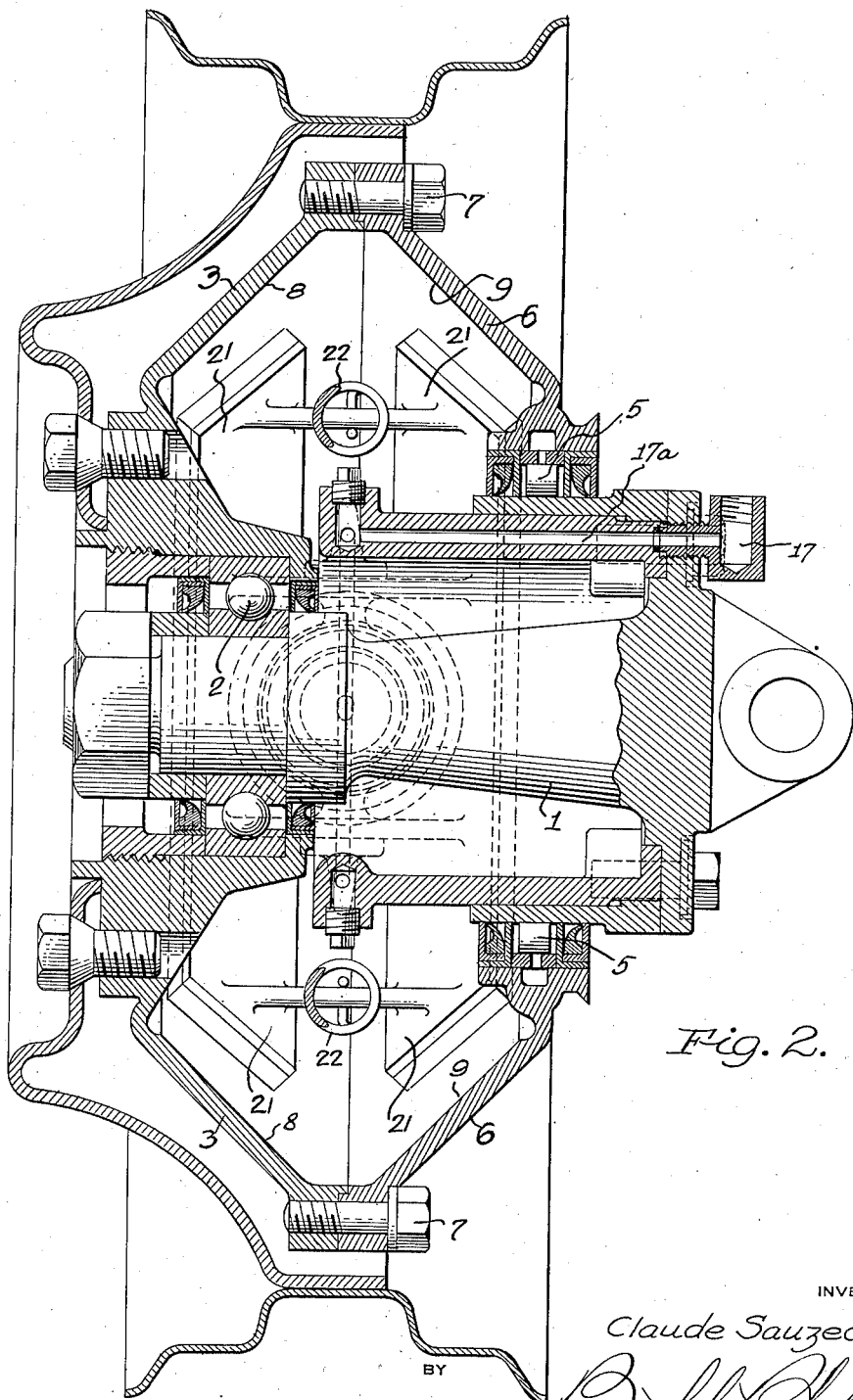
Fig. 2 is a horizontal section taken substantially on the line 2—2 of Fig. 3.
Figure 3:
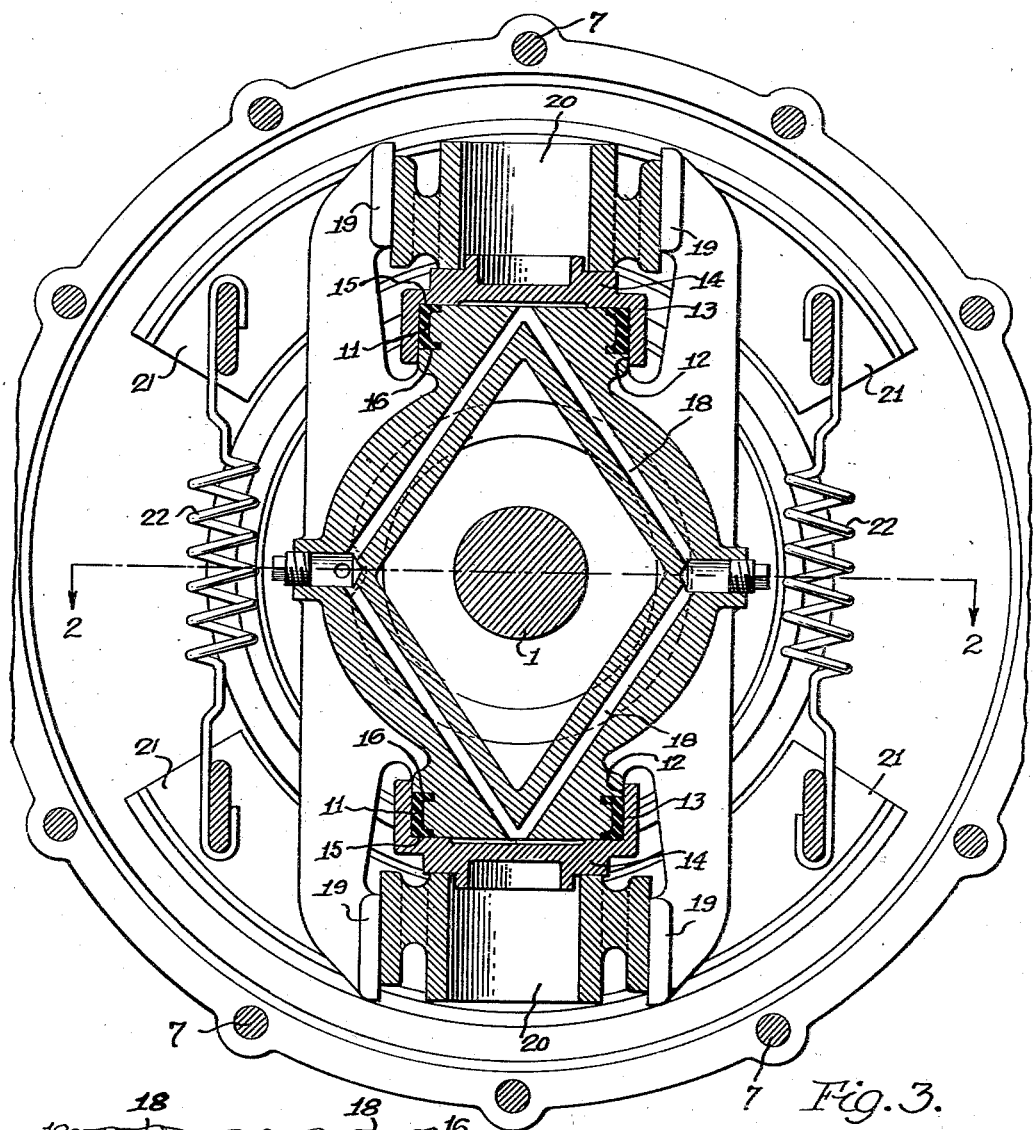
Fig. 3 is a section taken on the line 3—3 of Fig. 1.

The numeral 1 designates an axle spindle having anti-friction bearings 2 on the outer end thereof supporting the outer section 3 of a combined wheel hub and brake drum structure. Secured with respect to the spindle 1 is a stationary spider 4 having anti-friction bearings 5 thereon supporting the inner section 6 of the hub and brake drum structure. The two sections 3 and 6 are bolted together at their peripheries as indicated at 7 and they are provided with internal obliquely disposed braking surfaces 8 and 9 respectively. The spider 4 is provided with diametrically opposed radially extending projections 10, circular in section and having annular shoulders 16. Each projection further has a pilot portion 12 upon which is slidably received an annular part 13 of an element 14 which is hereinafter referred to as the movable element. The bottom of the annular formation 13 is provided with an end wall or shoulder 15 and an elastic seal 11 has its opposite ends vulcanized respectively to the serrated shoulder 16 and the end wall or shoulder 15. The projecting portion 10 has an annular bead 10a which functions to crowd the rubber of the sleeve 11 into engagement with the inner wall of the annular formation 13.

Extending through the spider 4 is a fluid passage 17a having a fitting 17 externally disposed for connection to the fluid conveying lines of the hydrostatic brake system. Extending from the passage 17a are passages 18 which extend through the radial projections 10 and open into the annular formations 13 so that upon the introduction of fluid under pressure through these passages the movable elements 14 are caused to move outwardly radially with respect to the spider. Adjacent each movable element 14 the spider is provided with guide arms 19 between which are received the cross members 20 each of which unite two brake shoes 21 having obliquely disposed annular faces adapted for engagement with the brake drum surfaces 8 and 9. Two sets of shoes are thus provided and the two sets are connected at their ends by springs 22 which function to draw them inwardly radially of the spider. The springs 22 maintain the cross members 20 in contact with their respective movable elements 14 so that when the latter are moved outwardly by fluid pressure as above mentioned they force the shoes 21 into engagement with the drums. When the fluid pressure is relieved the springs 22 retract the brake shoes and force the movable elements 14 inwardly until the bottom walls of the annular formations 13 contact the outer ends of their respective projections 10.

Figure 4:
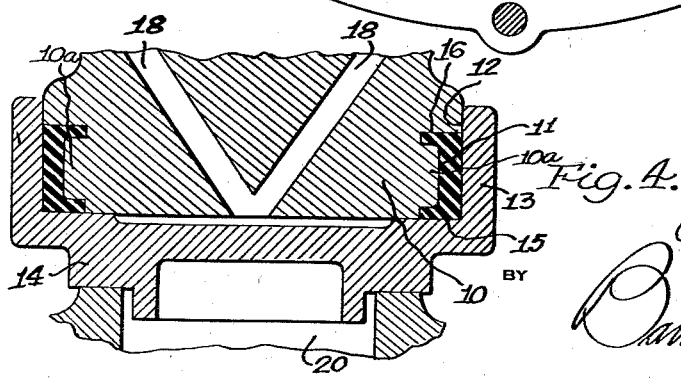
Fig. 4 is an enlarged section of a detail.

In assembling the present brake the elastic sleeves 11, of partially cured rubber, are placed over the projections 10 and the annular formations 13 are then slipped over the pilot portions 12 so as to compress the sleeves 11 substantially as illustrated in Fig. 4. The external surface of the projection 10 and the inner surface of the annular formation 13 are coated with a material, such as liquid glass, which will prevent the rubber sleeve 11 from becoming surface bonded thereto during vulcanization thereof while the shoulder 16 and the end wall or shoulder 15 are both treated to provide for vulcanization of the rubber thereto. The movable element and the spider are then subjected to sufficient heat to cause vulcanization of the rubber to the desired extent with the result that the rubber of the sleeve becomes surface bonded to the serrated shoulder 16 and the end wall or shoulder 15. As shown, movement of the movable element 15 outwardly in response to fluid pressure may take place by stretching the rubber of the sleeve as shown in Fig. 5.

Although a specific embodiment of the invention has been illustrated and described, it will be understood that various changes may be made within the scope of the appended claims without departing from the spirit of the invention and such changes are contemplated.

What I claim is:—

1. A fluid pressure motor for use in a brake assembly having a brake drum, brake shoes adapted to contact said drum, a stationary spider supporting said shoes for movement radially into engagement with said drum, said motor comprising a fluid pressure chamber integral with said spider, a movable element associated with said chamber, a seal formed of elastic material supported against radial expansion by the wall of said chamber and having one end surface bonded to a transverse wall of said chamber and its opposite end surface bonded to said movable element, said movable element being adapted to engage means on said shoes whereby movement of the latter moves said shoes radially into contact with said drum.

2. A fluid pressure motor for use in a brake assembly having a brake drum, and brake shoes, comprising a stationary spider, guide means on said spider adapted to support said shoes for movement radially of said drum, said spider having fluid pressure means adjacent each guide means and comprising a pair of relatively movable elements having interfitting portions forming a fluid pressure chamber, and a sleeve of elastic material having its opposite ends surface bonded to respective relatively movable elements and sealing said pressure chamber, said sleeve being supported against radial expansion by one of said interfitting portions.

3. A fluid pressure motor for use in a brake assembly comprising a stationary spider adapted to support a brake shoe for movement into engagement with a brake drum, a cylindrical body closed at one end, said spider having a formation thereon slidably supporting said cylindrical body and cooperating therewith to form a pressure chamber within said body, said cylindrical body being adapted to move outwardly of said spider to engage said shoe to force it into engagement with said drum upon the introduction of fluid under pressure into said pressure chamber, and means for sealing said pressure chamber, said means comprising an elastic body vulcanized to said cylindrical body and spider, said elastic body being supported by said cylindrical body for lengthwise stretching without radial expansion.

4. A fluid pressure motor for use in a brake assembly comprising a stationary spider adapted to support a brake shoe for movement into engagement with a brake drum, a cylindrical body closed at one end, said spider having a formation thereon slidably supporting said cylindrical body and cooperating therewith to form a pressure chamber within said body, said cylindrical body being adapted to move outwardly of said spider to engage said shoe to force it into engagement with said drum upon the introduction of fluid under pressure into said chamber, and means for sealing said pressure chamber, said sealing means comprising a sleeve of elastic material having its opposite ends vulcanized respectively to said cylindrical body and said spider formation supporting the same, said sleeve being confined against radial expansion by said cylindrical body.

5. A fluid pressure motor for use in a brake assembly comprising a stationary spider adapted to support a brake shoe for movement into engagement with a brake drum, a cylindrical body closed at one end, said spider having a formation thereon slidably supporting said cylindrical body and cooperating therewith to form a pressure chamber within said body, said cylindrical body being adapted to move outwardly of said spider to engage said shoe to force it into engagement with said drum upon the introduction of fluid under pressure into said pressure chamber, and means for sealing said pressure chamber, said sealing means comprising a rubber sleeve having its opposite ends surface bonded to said cylindrical body and said spider formation respectively, said sleeve being confined against radial expansion by said cylindrical body.

6. A fluid pressure motor for brake assemblies having a stationary spider, a brake drum rotatably mounted with respect to said spider, and brake shoes adapted to engage said drum, said motor compressing guide means on said spider supporting said shoes for movement into engagement with said drum, a movable element mounted adjacent each guide means and adapted to engage the shoe supported thereby to move the same into engagement with said drum, said movable element having an annular formation providing a fluid pressure chamber, means on said spider for guiding movement of said movable element, a rubber seal connected by vulcanization to said movable element and to said spider for sealing said pressure chamber, and means for conveying fluid under pressure to said pressure chamber.

7. A fluid pressure motor for brake assemblies having a brake drum rotatably mounted and brake shoes adapted to engage said drum, comprising a stationary spider having integral guide means adapted to support said shoes for movement into engagement with said drum, a movable element mounted adjacent each guide means and adapted to engage the shoe supported thereby to move the same into engagement with said drum, said movable element having an annular formation providing a fluid pressure chamber, means on said spider for guiding movement of said movable elements, a sleeve of elastic material permanently connected to said movable element and to said spider for sealing said pressure chamber, said sleeve being confined against radial expansion by said annular formation, and means extending through said spider for conveying fluid under pressure to said pressure chamber.

8. A fluid pressure motor for brake assemblies having a brake drum rotatably mounted and brake shoes adapted to engage said drum, comprising a stationary spider having integral guide means on said spider supporting said shoes for movement into engagement with said drum, a movable element mounted adjacent each guide means and adapted to engage the shoe supported thereby to move the same into engagement with said drum, said movable element having an annular formation providing a fluid pressure chamber, means on said spider for guiding movement of said movable elements, said spider having a formation extending axially into said annular formation and adapted to engage the bottom thereof to restrict movement thereof inwardly, an elastic seal for said pressure chamber, said seal having its opposite end permanently secured to movable element and spider respectively and confined against radial expansion by said annular formation, and means for conveying fluid under pressure to said pressure chamber.

9. A fluid pressure motor for brake assemblies having a brake drum rotatably mounted and brake shoes adapted to engage said drum, comprising a stationary spider having integral guide means on said spider supporting said shoes for movement into engagement with said drum, a movable element mounted adjacent each guide means and adapted to engage the shoe supported thereby to move the same into engagement with said drum, said movable element having an annular formation providing a fluid pressure chamber, means on said spider for guiding movement of said movable element, said spider having a formation extending axially into said annular formation and adapted to engage the bottom thereof to restrict movement thereof inwardly and of a smaller diameter than said annular formation whereby to provide a shoulder, an elastic sleeve within said annular formation and having its opposite ends surface bonded to said shoulder and the bottom of said annual formation respectively, and means for conveying fluid under pressure to said pressure chamber.

10. A fluid pressure motor for brake assemblies having a brake drum rotatably mounted and brake shoes adapted to engage the drum, comprising a stationary spider having guide means adapted to support said shoes for movement radially with respect to the drum, a movable element adjacent each guide means adapted to engage said shoes to move the same radially into engagement with said drum, each movable element having an annular formation providing a fluid pressure chamber, said spider having a radial projection engaged by said annular formation whereby it closes the open end of said annular formation and supports said movable element for movement radially, said radial projection having a reduced portion extending into said annular formation and adapted to engage the bottom thereof, an elastic seal for said pressure chamber disposed within and supported by said annular formation, and means for conveying fluid under pressure to said pressure chamber.

11. A fluid pressure motor for brake assemblies having a brake drum rotatably mounted and brake shoes adapted to engage the drum, comprising a stationary spider having guide means adapted to support said shoes for movement radially with respect thereto, a movable element adjacent each guide means adapted to engage said shoes to move the same radially into engagement with said drum, each movable element having an annular formation providing a fluid pressure chamber, said spider having a radial projection engaged by said annular formation whereby it closes the open end of said annular formation and supports said movable element for movement radially, said radial projection having a shoulder, an elastic sleeve having one end surface bonded to said shoulder and its other end surface bonded to the bottom of said annular formation, and means for conveying fluid under pressure to said pressure chamber.

CLAUDE SAUZEDDE.